(12) United States Patent
Binns et al.

(10) Patent No.: US 9,497,243 B1
(45) Date of Patent: Nov. 15, 2016

(54) CONTENT DELIVERY

(71) Applicant: Amazon Technologies, Inc., Seattle, WA (US)

(72) Inventors: Justin Michael Binns, Auburn, WA (US); Charles Benjamin Franklin Waggoner, Portland, OR (US); Joshua B. Barnard, Seattle, WA (US); Matthew James Bordenet, Sammamish, WA (US); Lars Christian Ulness, London, GA (US); Marc Joliveau, Seattle, WA (US); Jim Knowler, London (GB); Terje Kristian Backman, Carnation, WA (US); Chris Longo, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 224 days.

(21) Appl. No.: 14/503,190

(22) Filed: Sep. 30, 2014

(51) Int. Cl.
*G06F 15/16* (2006.01)
*H04L 29/06* (2006.01)
*H04L 29/08* (2006.01)

(52) U.S. Cl.
CPC ......... *H04L 65/602* (2013.01); *H04L 65/4069* (2013.01); *H04L 67/322* (2013.01)

(58) Field of Classification Search
CPC ... H04L 65/1069; H04L 67/10; H04L 67/22; H04L 47/82; H04L 45/74; H04L 65/60; G06F 17/248; H04N 21/812
See application file for complete search history.

(56) References Cited

U.S. PATENT DOCUMENTS

| | | | |
|---|---|---|---|
| 2006/0015637 A1* | 1/2006 | Chung | H04L 29/06027 709/232 |
| 2013/0179577 A1* | 7/2013 | Singh | H04L 65/60 709/226 |
| 2014/0130104 A1* | 5/2014 | Ruffini | H04N 21/2181 725/62 |

* cited by examiner

*Primary Examiner* — Kim T Nguyen
(74) *Attorney, Agent, or Firm* — Thorpe North & Western LLP

(57) ABSTRACT

A technology for content delivery is provided. In one example, performance of a caching network, performance of a delivery network, and customer demand are modeled. Instructions are provided for a client device on how to request content based on the modeled performance of the caching network, the modeled performance of the delivery network and the modeled customer demand.

20 Claims, 10 Drawing Sheets

CONTENT DELIVERY

BACKGROUND

In video streaming, a customer has a set of inflexible constraints, such as a local network and device capabilities. Customers also have a set of flexible system characteristics which may be modified, for example: which CDN (content delivery network) to fetch video from; which specific network edge to select and, in some cases, which server to fetch the video from; which bitrate or bitrates (both audio and video) to fetch; which protocol to use; which packaging or streaming technology to use; and so forth.

A goal is to deliver a quality playback experience for the customer. Conventionally, the solution for providing a quality video playback experience has been based on a reactive heuristic model—start with a reasonably educated guess for selecting network configurations, and then, based on observed performance, modify those parameters that are flexible in order to improve or maintain the customer experience. The fundamental problems with this approach include: that this solution is reactive, rather than pro-active; that some of the variable parameters are not variable after stream initiation (packaging format or streaming technology may unavoidably cause a video interruption, for example); and local optimization does not always produce the best experience for the local user or across all users on average.

Current systems react dynamically to CDN failure by choosing different CDNs. However, CDN selection is either done server-side on a statistical basis (e.g., allocation of streams according to some concept of 'balance' on a percentile basis) or client-side based on local observed conditions.

DETAILED DESCRIPTION

Figure 1:
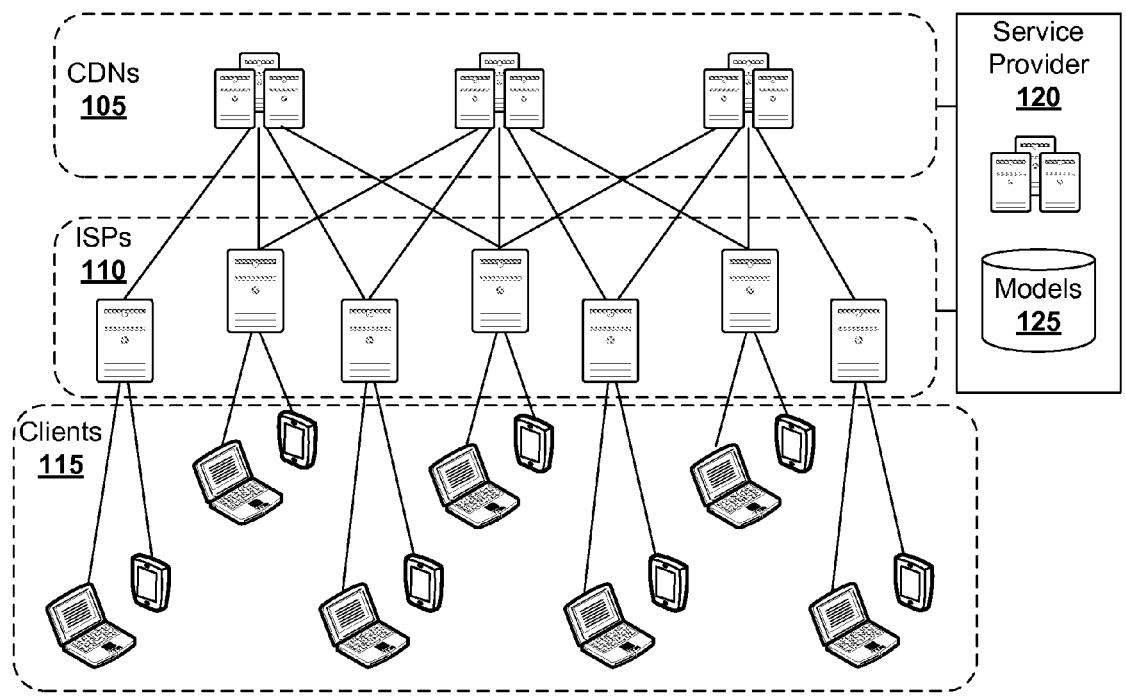
FIG. 1 illustrates a content delivery network in accordance with an example of the present technology.

A technology for content delivery to clients is provided. In one example, performance of a caching network, performance of a delivery network, and customer demand are modeled. Instructions are provided for a client device on how to request content based on the modeled performance of the caching network, the modeled performance of the delivery network and the modeled customer demand of many customers. For example, the instructions may include at least one of: which caching network to use for the video delivery, which edge of the caching network to use for the video delivery, or at what bitrate to receive the video delivery. Examples of the present technology described below are described primarily in the context of a caching network as a content delivery network (CDN) or the delivery network as an internet service provider (ISP), but are not limited to such, as will be described in additional detail later.

In accordance with another example, a method for content delivery includes modeling performance of video delivery to a client through a content delivery network (CDN). The method may also include modeling performance of the video delivery to the client from an internet service provider (ISP) in communication with the content delivery network. The method may also include modeling customer demand for the video delivery. The customer demand may be a future demand predicted based on historical and current demand for the video delivery. Instructions may be provided for a client device on how to request the video delivery based on the modeled performance of the CDN, ISP and the model of customer demand. Some example instructions may include which content delivery network to use for the video delivery, which network edge of the content delivery network to use for the video delivery, or what bitrate to retrieve the video delivery from the CDN.

The present technology utilizes larger scope and broader information than a CDN or content provider has had access to in the past in order to inform the variable parameter selections that clients are making. The inherent complexity in current systems is that, while a great deal of information may be known about what is currently going on in the various networks and systems involved in the process of video delivery, accurately predicting future behavior in order to inform heuristics that pro-actively improve the customer experience has been elusive. While graphs of key metrics are often clearly cyclic and appear projectable with simple interpolation, the reality is that the various components make up a highly chaotic and complex system that do not react in clearly predictable ways to the various changes that may occur within a computing network. As a simple example, shifting 5% of traffic from one CDN to another may cause improved performance for both CDNs, yet reduced service to a subset of customers on a particular ISP. Such effects (over-simplified for the purposes of this example) may be considered when using the present technology before a decision to shift traffic is made in order to avoid providing a reduced experience for customers rather than an improved one.

FIG. 1 illustrates an example system for video delivery in accordance with an example of the present technology. While local client improvements as used in the past are useful, and any improvement to client behavior in the face of failures impacting customers is a significant win for customers, the present technology provides better performance in reducing or even eliminating customer impacting buffering events and fatal errors by using rich information collected about global, regional, and local networks, customer demand patterns, and even foreknowledge of major internet events to proactively change client behavior. This manipulation of a video delivery network over a wide area, anticipation of problems and countering the problems before the problems impact customers, as well as the provisioning of valuable information that local clients (and local software players on a client) can use to make better decisions and provide better quality, may provide customers with a desirable video experience.

A service provider 120 may provide video delivery to clients 115 using a number of different CDNs 105, ISPs 110, etc. Clients 115 may be enabled to select a CDN from which to receive the video when multiple CDNs 105 are available to choose from. However, clients are generally more limited with selection of an ISP 110. Any number of clients 115 may connect to a CDN 105 or service provider 120 over an ISP 110. Network topologies for delivering content to clients are generally known.

The present technology may provide a set of adaptive, interdependent models 125 utilizing machine learning techniques and multi-variate projections to provide information to individual clients 115 for improved video playback experiences. This information may allow clients 115 to make proactive choices to prevent anticipated adverse delivery conditions, rather than waiting until the onset of trouble to attempt to salvage the customer experience. These models 125 may be continuously updated through feedback from clients (or the client's local players) about their local heuristic decisions and the results of those decisions (video fragment fetch success, quality delivered, etc.). This virtuous feedback cycle enables the proactive management of an active customer base, delivering better video on average to the customers, and eliminating or reducing buffering and error events (outside catastrophic failure situations). This continuous optimization enables rapid improvement of delivery performance with current technologies by (for example): dynamically adapting to changing CDN behavior over time; modifying client choices to best utilize ISP bandwidth; and improving perceived customer video quality during adverse network events. As new technologies are developed, such as alternative delivery methods (i.e., UDP (User Datagram Protocol)-based streaming and/or forward error correction) or new encoding choices (optimized encodes or alternative formats), this combined global/local optimization strategy may ensure a satisfying experience for every customer.

The present technology may enable local clients to optimize the video experience for the local customer. Global models may be used to make changes to local client behavior that will prevent or avoid adverse situations to reduce or eliminate impact on customers. Measurable and reported behavior may provide a basis for model behavior. Feedback from local clients may be valuable in developing and maintaining accurate global models. The present technology enables continuous improvement, where virtuous feedback cycles may be used to improve customer experiences wherever possible.

The present technology may produce a system with active simulation at several levels, including network simulation at global, ISP, and individual customer layers, where customer demand, internet traffic simulation (e.g., time-of-day variation) and input from actual customer preferences and feedback, combined with local detail, are used to produce heuristic decisions for video and/or audio stream network selection. An example decision may be which CDN to use, which endpoints or specific routes (e.g., gateways, routers, etc.) are to be used to route traffic, etc.

Heuristic decisions may be made as a result of output from one or more of the models. In one example, rules may be used to determine what instructions to send to a client. Output from the models may be associated with various different rules for sending different sets of instructions based on different potential outputs. In another example, rather than using heuristics, the models themselves, or predictions made using the models may define the instructions sent to the client. For example, the models may be used to predict a result of a change being made to a control of one or more of the systems, such as a shift of one or more client devices to another CDN. Because current performance is known and may be used as inputs, as is described in further detail below, the result may be compared against the current performance. If the result is an improvement over current performance, the change to the control used for the prediction may be the instructions sent to the client (e.g., shift client device to another CDN).

Although many of the examples herein relate to delivery of video content, the technology may be used for delivery of other content as well. For example, the content may be media content. The content may include downloads, audio streaming, web pages, text, images and so forth.

Also, as mentioned previously, the present technology is not limited to delivery of content from a CDN or through an ISP. More generally, a content delivery network is a type of a caching network. A caching network may, for example, be a network of storage devices for storing content and may include any number of caching layers or caching components distributed in any suitable manner. As specific examples, a caching network may include storage devices on a hyper local level, such as a hard drive in a dormitory room, or caching may be provided at a local level of a cable provider or local exchange. Also, an ISP may generally be a type of a delivery network. An example delivery network other than an ISP may be a local network or local area network (LAN) that has direct access to the internet or another packet switched network through government research laboratories, universities or other non-commercial means. The following examples describe modeling performance of a CDN and an ISP. However, the modeling may be generalized to include modeling of caching networks generally and/or modeling of delivery networks generally. In other words, and continuing with the examples just described, a network of individual hard drives or storage devices at specific locations for delivering content to customers or a LAN may be modeled in order to improve content delivery to customers from those hard drives or over the LAN.

Figure 2:
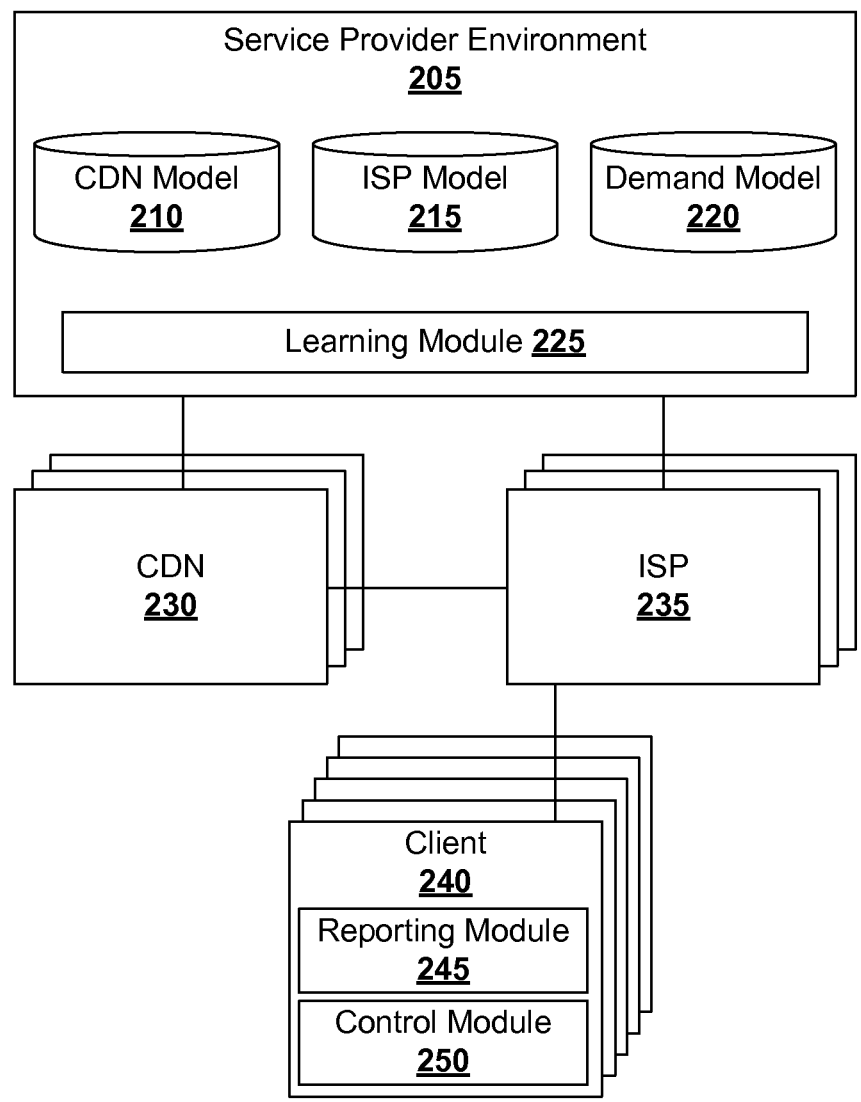
FIG. 2 illustrates models and modules at a service provider environment and client for use in a content delivery network in accordance with an example of the present technology.

Reference will now be made to FIG. 2. FIG. 2 illustrates a content delivery network, including a service provider environment 205 from which videos may be provided to clients 240 via various CDNs 230 and/or ISPs 235. The present technology may assist in determining what changes to make to improve the customer experience, with an understanding of the chaotic nature of the effects on the overall system of any given change. The problem may be seen as a combinatorial optimization problem wherein a best fit of many moving pieces can be thought of as a multi-dimensional knapsack optimization problem, which is NP-Hard. Because a direct solution is infeasible based on current network configurations, some assumptions may be made to reach an approach that is successful.

One assumption may be that the 'quality of customer experience' can be measured and scored based on data that can be obtained from clients 240. The clients may have a reporting module 245 by which various performance characteristics of the video delivery may be reported back to the service provider environment 205. This data may serve as inputs to a learning module 225 used to create models 210, 215, 220 to predict various scenarios and determine a course of action for quality video delivery. A good approximation of 'quality' can be mathematically derived, either from data collect directly at the service provider environment (such as from CDN partners) or from additional data collect from the client 240.

Another assumption that may be made is that one or more predictive models can describe the system. These predictive models may be linear regressions, multinomial support vector machines, deep learning multi-layer perceptrons, or any of a variety of other types of machine learned models. Specifically, models may be created at the service provider environment 205 by a learning module 225 and the models: may have predictable behavior; can be improved through machine learning techniques; are reactive to the various controllable parameters; and have sufficiently approximate system behavior to inform decisions about changes in those parameters. By properly simulating the basic actors in the system, interactions between these actors may be simulated and predictions may be produced that are at least approximate actual behavior.

Models may be identified and implemented in correct and supportable ways. The example models illustrated in FIG. 2 include a CDN model 210, an ISP model 215, and a Demand model 220. These models will be described in greater detail with respect to subsequent figures. In addition to the report module 245, the client may be provided with a control module 250 to control certain parameters, such as the selection of a CDN from which to request a video, a bitrate at which to request the video delivery and so forth. The control module 250 may enable the client to respond to instructions from the service provider environment 205 based on outputs from the models 210, 125, 220.

Figure 3:
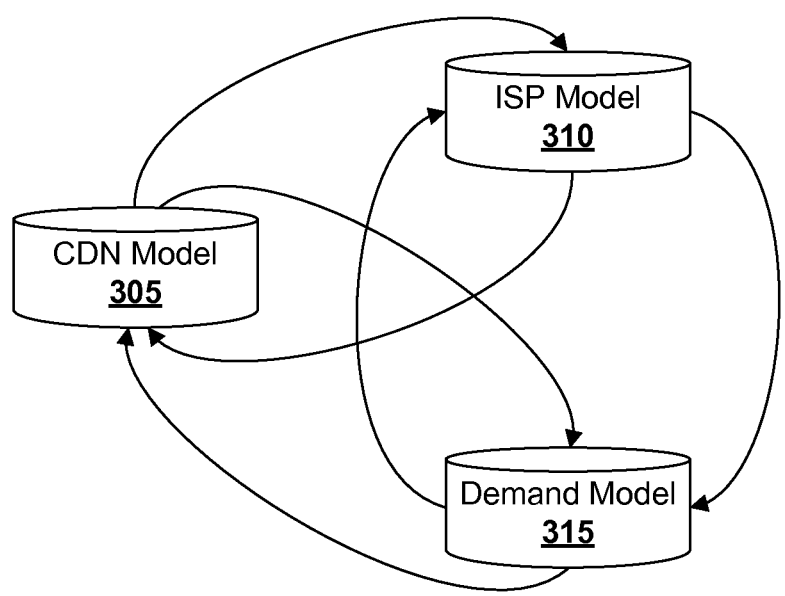
FIG. 3 illustrates a virtuous circle of inputs and outputs from different models for use in a content delivery system in accordance with an example of the present technology.

Reference will now be made to FIG. 3. A system of the present technology may incorporate various components, such as: a model describing CDN performance per ISP, per region, over time; a model describing ISP performance in each region (independent of CDN), over time; a model of customer demand per ISP, per region, over time; a near-real-time, high resolution scoring system for each model; a projection mechanism to predict performance variation given parameter changes; and a set of systems providing 'tunable' behaviors that impact the system. Each of these will be discussed in more detail later. An example overall interaction of these components is shown in FIG. 3.

As shown in FIG. 3, the three models are inter-dependent and together provide a complete system that may project future results. Each model may be updated through the application of real-time data, evolving the models through machine learning techniques as the real world behaviors of each modeled system change. In order to make behavioral decisions, the current system may be regularly projected into the future. If this projection indicates adverse delivery conditions, sets of changes may proposed by the system and new projections may be performed for such changes. The best of these projections may then determine the set of changes to make, and the various models may be updated accordingly. The set of changes that results in the best overall performance may be transmitted to client devices for implementation. As real data updates the situation and the models, the optimization process may continue, and further changes may be made. In order to eliminate thrashing or uncontrolled, drastic shifts, limits may be placed on the rate of change and frequency of change permitted without human interaction.

Each model may incorporate support for 'event' type disruptions (e.g., major software releases in the CDN and ISP models, popular DAB (Day After Broadcast) releases in the customer demand model. DAB may refer to a type of video product wherein streaming access to popular content, such as current television series episodes for example, is provided the day after the television network broadcast. Such titles are popular and may cause demand spikes, particularly for high-demand content. The scoring systems must incorporate appropriate parameters allowing each model to optimize for behavior that will improve the customer experience, and be both computable in approximately real-time and reactive to changes in model behavior over short time periods. The systems that provide mechanisms for changing model behavior can include, for example, CDN selection changes, DNS replacement enabling edge changes, heuristic input for local clients or limits on available bitrates on a per-client or per-client-group basis.

The models are described herein, and each is described in terms of the inputs and outputs for that model. Each model may take as input the settings or controls for the various systems that enable control of overall performance that were in place at the time associated with the inputs for the other models. This is useful because systems for providing video on demand controls may not have direct correlation on any of the particular natural inputs to the models. The machine-learned models may therefore incorporate the effects of these dependent controls in the model outputs. In other words, by considering the settings for the systems with the outputs from the models of those systems together, correlation may be made for the effect of the settings of one system with the output for another system, since the models may be interdependent. Without accounting for these systems, predicting the results of changing the parameters that serve as the available controls for operation of the video on demand system is difficult.

One concept useful in the iterative optimization of a customer experience is a customer experience score. This score may capture or represent the overall quality of customer experience. In other words, the score may indicate how well customer expectations are being met or exceeded. Some general tenants of this score may be as follows. This score may incorporate the ability to deliver streams reliably, and so may include fragment fetch failures, and may penalize buffering and error events. This score may incorporate a quality aspect. In other words, bitrate downshifts may be penalized and bitrate upshifts may be rewarded. Some aspect of resilience to failure or overall system health may also be considered. A configuration that allows local players to keep buffers full may be more resilient to catastrophic changes in delivery conditions, and may be rewarded in scoring.

The customer experience score may be what is used to assess the better projection or better outcome from the models. The customer experience score may also be used to monitor overall behavior of the combined set of models. The models themselves will now be described.

Figure 4:
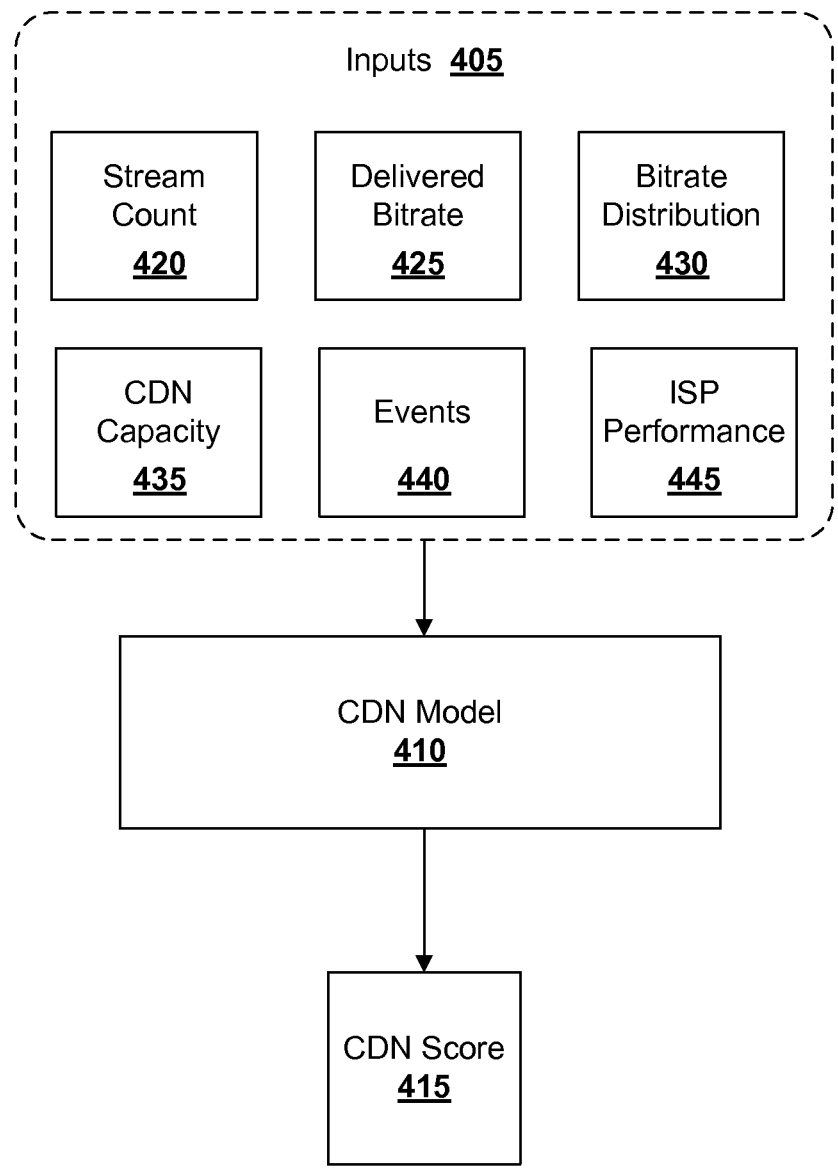
FIG. 4 illustrates example inputs and output for a CDN model in accordance with an example of the present technology.

Reference will now be made to FIG. 4. FIG. 4 illustrates example inputs and an output for a CDN model. The CDN model may be instantiated as one or more CDN models on a per-delivery-type (incorporating protocol and transport), per-ISP, and per-region basis. The region sizes may be determined based on meaningful customer count, and may involve periodic re-assessment in order to remain properly relevant. Statistical variance of predicted values from actual values may be used to drive this re-assessment. Given that the delivery type, ISP and region are fixed, the set of input vectors may be constrained to actual performance characteristics, over time. The particular model type and set of time ranges that produce an optimal result may vary between implementations. However, a general example of potential inputs and outputs is provided, with the understanding that an adaptive machine-learning-oriented regression model may be utilized.

Some example inputs 405 for the CDN model 410, for each point in time, may include one or more of: the number of streams being delivered 420; the number of bytes being delivered (current delivered bitrate 425); the distribution of bitrates among streams 430 (i.e., whether the bitrates are evenly distributed, grouped in a modal, bi-modal, or multi-modal pattern, etc.); the stated capacity of the CDN 435 (if any); the impact of any special events 440; and ISP performance 445. The output may be a CDN score 415. The CDN score 415 may be computed through the CDN model 410 based on the inputs. By optimizing for this score, the technology may optimize for effective delivery of customer video. This CDN score 415 may be an input to the ISP model. This CDN score may also be an input to the customer demand model, as the ability to deliver the video quality customers desire may have an impact on customer demand.

Figure 5:
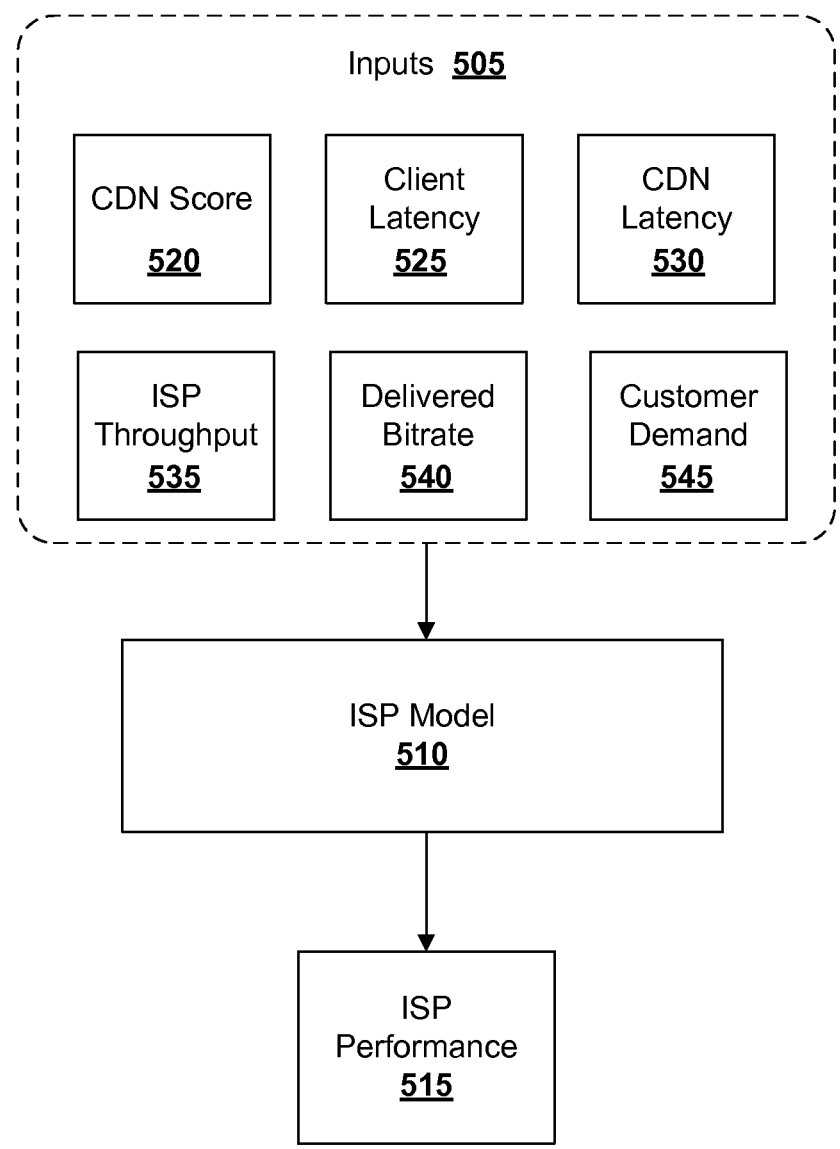
FIG. 5 illustrates example inputs and output for an ISP model in accordance with an example of the present technology.

Referring now to FIG. 5, an ISP model 510 is illustrated, including example inputs 505 and an ISP performance output 515. The ISP model 510 may be instantiated as one or more ISP models on a per-region and per-transport basis. The ISP model may be agnostic to CDNs and the protocols used. Of the CDN, ISP and customer demand models, the ISP model may be the most error-prone model, as direct measurement of ISP performance by third parties is difficult or nearly impossible in present network systems. However, detailed log information may be obtained from CDN partners, as well as detailed information from the clients. From this information, ISP performance characteristics may be generated. With the added information about CDN performance (from the CDN score), customer demand (from the Customer Demand model), time-of-day Internet demand variation, and special event occurrences, the ISP model may be created to predict congestion and general performance characteristics fairly well. This model may be useful in predicting failures that impact customers on a regular basis, as ISP congestion is often the ultimate cause of re-buffer and fatal error events.

The inputs for the ISP model 510, which may be a regression model, may include one or more of: the CDN Score 520 for each CDN in the region/transport being modeled; latency 525 as reported by the client; latency 530 as reported by the CDN (if available); ISP throughput 535 as computed by the client; bitrate delivered 540 as computed by the CDN; and customer demand 545. The output may be an ISP performance score 515, which may be a measure of ISP delivery capability and which may capture the impact the ISP has on ultimate delivery of customer experience. The purpose of the model may be to measure how well the ISP is serving customers of a service provider in order to positively differentiate between ISP problems and CDN problems. This differentiation is useful because the remediation path for ISP congestion may be different from the remediation path for CDN congestion.

Figure 6:
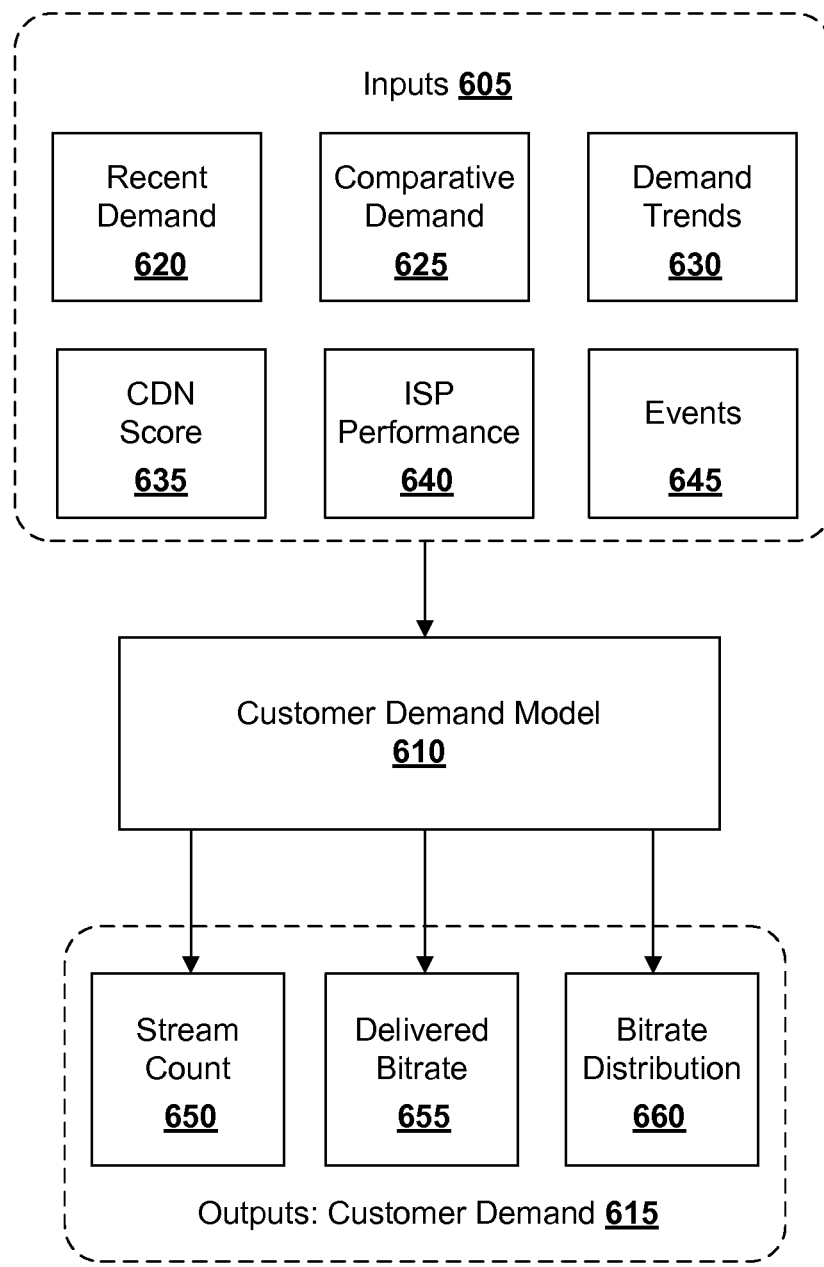
FIG. 6 illustrates example inputs and outputs for a customer demand model in accordance with an example of the present technology.

Reference will now be made to FIG. 6. FIG. 6 illustrates a model for customer demand 610, along with example inputs 605 and outputs 615 for the model. Modeling customer demand is useful in order to understand the expected load on the ISP and CDN over time, which feeds into the projected performance of the ISP and CDN. For example, when projecting future behavior, stream and bitrate served numbers may be estimated for the CDN model inputs, as well as bitrate distribution. Further, ISP utilization may be estimated for an input to the ISP model. In other words, these numbers or inputs for the CDN and ISP models may be derived from the customer demand model. In turn, the customer demand model, while largely driven by observed customer behavior, may be informed by CDN and ISP performance, as well as by special events, such as DAB (Day After Broadcast) content releases or high-impact non-video-on-demand entertainment events (e.g., the Super Bowl).

The model for customer demand may have multiple outputs 615. The model may be distinct per region and ISP, as customer behavior is tied to location and access method. In other words, the model may account for regions and ISPs separately or individually. Alternatively, multiple models, including a different model for each region and/or ISP may be used. As example inputs 605, the customer demand model may include: recent 620 and comparative 625 demand; past demand trends 630; current CDN performance 635 (i.e., the output of the CDN model or the CDN score); current ISP performance 640 (i.e., the output of the ISP model); and current or recent 'major events' 645. As example outputs 615, estimated stream count 650, total bits delivered 655, and distribution of bitrate 660 may be projected. One or more of these outputs may serve as inputs to the CDN and/or ISP models.

Figure 7:
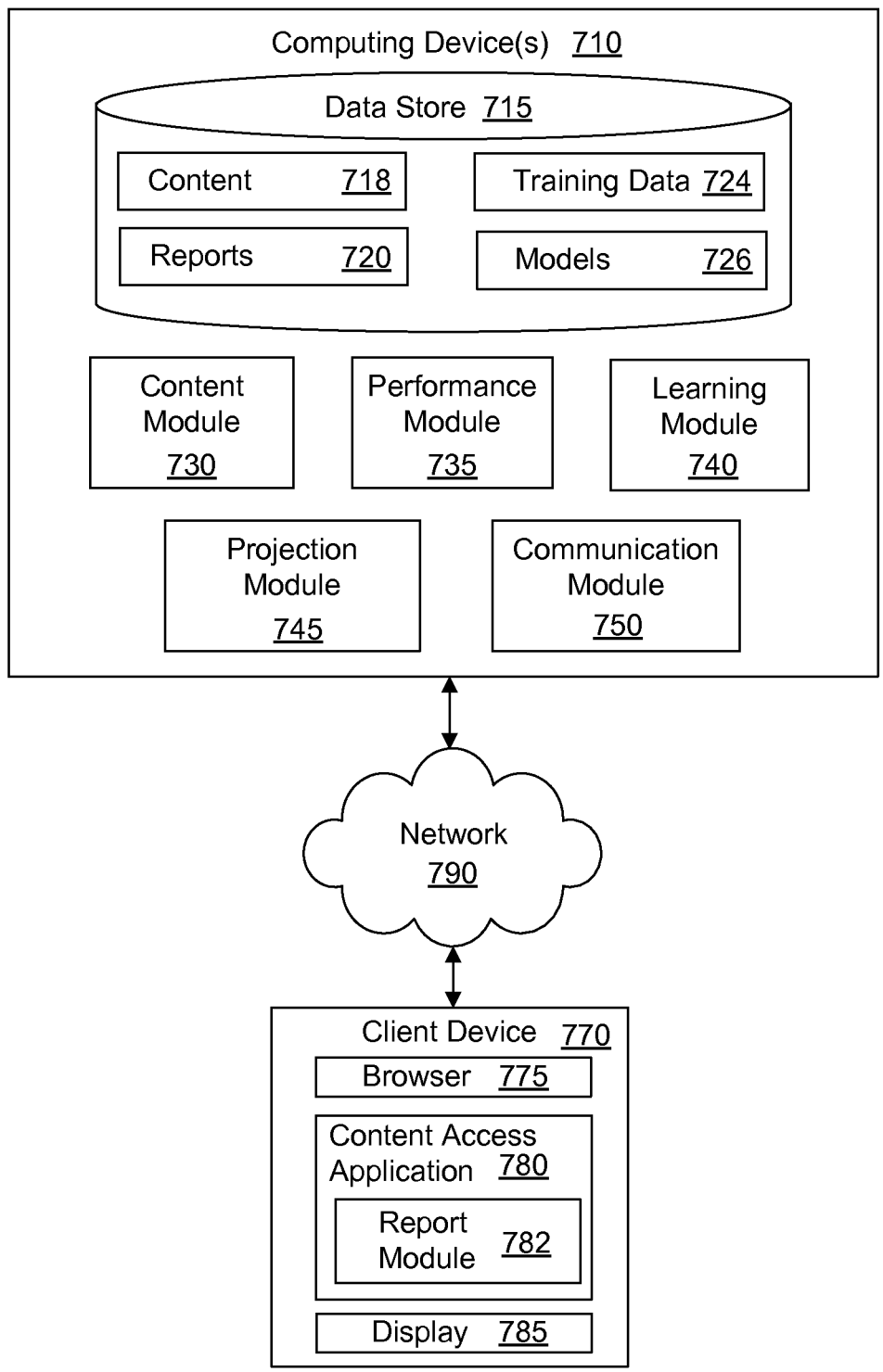
FIG. 7 is a block diagram of a content delivery system in accordance with an example of the present technology.

Referring to FIG. 7, a content delivery system is illustrated in accordance with an example of the present technology. The content 718 may be media content such as video content, audio content, or other content. In some examples, the content 718 may be delivered as streaming content to a client device 770 through a browser 775 or content access application 780 over a network 790. The content access application 780 may be configured to respond to communications via a communication module 750 at the computing device 710 regarding how the client device 770 will request delivery of the content, as may be determined by the projection module 745.

A part of the process of modeling and projecting behavior is the ability to change behavior when projections fall outside of desired ranges. Unless there is a way to modify the system, then there is little advantage to customers in modeling the system. While the three models form a cohesive representation of a networking ecosystem, the present technology provides information and intelligence to client device heuristics that can change behavior, and ultimately prevent customer-impacting degradation of service. In order to affect client device 770 behavior in order to optimize customer experiences, there are various actions that may be taken.

Existing systems at a computing device 710 for a service provider can be used to manipulate the percentage of traffic allocated to various CDNs. As these systems are refined in order to provide ever more detailed levels of control, they can in turn be leveraged to manipulate the behavior of the various models. For example, if the model determines that a degradation in customer experience is going to occur due to congestion in peering between CDN A and ISP 1, while peering between CDN B and ISP 1 is underutilized, shifting traffic in that region on that ISP from CDN A to CDN B may mitigate customer impact. Likewise, if CDN edge capacity in a region is reaching saturation, shifting traffic in order to relieve stress may prevent a customer-impacting event (e.g., a failure or buffering event). Individual fragments of video or other content may be distributed among CDNs according to the modeled behavior, enabling highly focused cache optimization and traffic distribution strategies.

As client device or local player heuristics improve and adaptive bitrate technology is adopted, the projection module 745 may determine to shift traffic among bitrate choices to improve average global video quality with minor impact to a few customers. For example, if several customers in a neighborhood are watching the same content, where one particular customer started before the others and may be settled on a high bit-rate stream, all of the customers may be better served by requesting that one customer reduce quality slightly in order to improve quality among the rest. Such decisions may be very carefully weighed and biased in favor of the best possible experience for every customer, as it is not in the interest of any customer for competing attempts at 'maximum quality' to cause degradation, re-buffering and fatal errors when ISP capabilities are exceeded.

Beyond distribution of traffic among CDNs, DNS resolution may be shifted to server-side mechanisms which allow for fine-grained client distribution among edge hosts within an edge cluster in a given CDN. This enables highly focused cache behavior and more accurate traffic shifting, especially with CDN partners who expose mapping and routing behavior to the service provider of the content. In this approach, some caution may be taken to avoid unnecessary or problematic competition between internal optimization algorithms and natural load-balancing operations of CDN partners. This approach may, however, be available as an option wherever the approach can improve customer experience.

In addition to the within-the-edge shifting that is enabled by the server-side DNS resolution, there is also an option of 'sub-optimal' routing, particularly in the case of CDN/ISP peer saturation. For example, a model may show that a particular CDN has significant excess capacity generally, but peering at a particular edge is not well optimized or is overloaded due to traffic not related to video delivery for the service provider. In this case, traffic may be proactively shifted to alternative edges that can serve the customer traffic. Once again, this behavior may actively compete with the internal load balancing of the CDN and caution may be exercised to avoid causing more issues than are solved.

The system may have a number of parts or components to provide the data to drive the best customer experience. In addition to the projection module 745 that supports changes to customer experience (CDN traffic shifting, DNS resolution with rules for intra- and inter-edge shifting, and client bitrate hinting), there are three models 724 that have been described previously, which may be continuously trained on real-time data and which create a set of projections which test various hypotheses using the models. (Other models may also be used, at least one additional example of which is described later). These hypothesis model sets may form a heuristics or machine learning system. By projecting the behavior of the system into the near future on several paths (e.g., steady-state and progressively more pessimistic models), behavior may be identified to mitigate customer impact in the pessimistic states prior to re-buffer or fatal error events. By computing statistical probability of each of the computed forward-looking models, preparations may be made for problems when they become statistically likely, while defining that threshold dynamically as model accuracy is improved.

Once an adverse situation is detected, the projected models may become more fine-grained and a Monte-Carlo tree search (MCTS) may be performed, where small changes are made in the various systems that are controllable and the expected response to those changes may be modeled to provide the system with feedback as to which changes may work and which changes are likely to exacerbate the problem. The best simulation for customers may be selected, the recommended changes may be made, and the data may continue to be sampled. As the various models are further refined, the projection analysis may be continued until customer impact is confidently remediated, or rather until the confidence in the steady-state zero-error case is relatively high. At this point, no further changes need to be made.

In one example, the system may include one or more server computers or other computing devices 710. Software on the computing device 710 may be an application or a computer program, such as may be designed to perform an activity, such as analyzing data, comparing data, learning models from data and so forth. Applications executable on the computing device 710 and in the service provider environment may be any suitable type or form or application as may be appreciated.

The system may include one or more data stores 715. The data store 715 may include or be configured to store any of a variety of useful types and formats of data. For example, the data store 715 may include a content data store 718 for storing media content such as audio, video or other types of content. The data store 715 may include a reports data store 720 for storing data reported about network performance and delivery of the content from a report module 782 at the client device 770. The data store 715 may also include a training data store 724 for storing training data for use in creating models for CDN performance, ISP performance and so forth. The data store 715 may further include a model data store 726 for storing the machine learned models created.

The term "data store" used herein may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media.

The system may include any number of modules useful for providing a content delivery service from the computing device(s) 710. For example, the system may include a content module 730 for making content in the content data store 718 available to CDNs and/or client devices 770. The system may include a performance module 735 configured to measure or evaluate performance of the ISPs or CDNs directly from the service provider environment or based on reports received from the client device 770 and generated by the report module 782. The system may include a learning module 740 to train the machine learned models used to predict performance of the various participants in a content delivery system, such as the CDNs, ISPs and clients.

The learning module 740 use any of a variety of machine learning methods to learn to predict performance, behavior, events and other factors that may impact content delivery. Machine learning may be an effective tool for use in optimizing selection of customers for targeted recommendations. Machine learning may use empirical data as input. Machine learning systems may take advantage of data to capture characteristics of interest having an unknown underlying probability distribution. Machine learning may be used to identify possible relations between observed variables. Machine learning may also be used to recognize complex patterns and make machine decisions based on input data. In some examples, machine learning systems may generalize from the available data to produce a useful output, such as when the amount of available data is too large to be used efficiently or practically.

Machine learning may be performed using a wide variety of methods of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bayes classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, subsymbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Another example of machine learning includes data pre-processing. Specific details regarding any of the examples of supervised, unsupervised, temporal difference or other machine learning described in this paragraph that are generally known are also considered to be within the scope of this disclosure. Support vector machines (SVMs) and regression are a couple of specific examples of machine learning that have been mentioned previously which may be used in the present technology.

The system may also include a projection module 745 configured to determine how best to deliver content from the content data store 718 to consumers at client devices (e.g., client device 770) over a network 790. The projection module 745 may use a communication module 750 to communicate at least some decisions for content delivery to the client device 770 for implementation by the client device 770. Example client devices 770 may include, but are not limited to, a desktop computer, a laptop, a tablet, a mobile device, a television, a cell phone, a smart phone, a hand held messaging device, a personal data assistant, an electronic book reader, heads up display (HUD) glasses or any device with a display 785 that may receive and present the video content.

The system may be implemented across one or more computing device(s) 710 in the service provider environment and include client devices 770 connected via a network 790. For example, a computing device 710 may include a data store and various engines and/or modules such as those described above and such modules may be executable by a processor of the computing device. The system may be implemented as a plurality of computing nodes or computing instances, each of which comprises at least one processor and a memory, where the computing nodes are configured to collectively implement the modules, data stores and so forth.

The modules that have been described may be stored on, accessed by, accessed through, or executed by a computing device 710. The computing device 710 may comprise, for example, a server computer or any other system providing computing capability. Alternatively, a plurality of computing devices 710 may be employed that are arranged, for example, in one or more server banks, blade servers or other arrangements. For example, a plurality of computing devices 710 together may comprise a clustered computing resource, a grid computing resource, and/or any other distributed computing arrangement. Such computing devices may be located in a single installation or may be distributed among many different geographical locations. For purposes of convenience, the computing device 710 is referred to herein in the singular form. Even though the computing device 710 is referred to in the singular form, however, it is understood that a plurality of computing devices 710 may be employed in the various arrangements described above.

Various applications and/or other functionality may be executed in the computing device 710 according to various implementations, which applications and/or functionality may be represented at least in part by the modules that have been described. Also, various data may be stored in a data store that is accessible to the computing device 710. The data store 715 may be representative of a plurality of data stores as may be appreciated. The data stored in the data store 715, for example, may be associated with the operation of the various modules, applications and/or functional entities described. The components executed on the computing device 710 may include the modules described, as well as various other applications, services, processes, systems, engines or functionality not discussed in detail herein.

The client device 770 shown in FIG. 7 may be representative of a plurality of client devices 770 that may be coupled to the network 790. The client device(s) 770 may communicate with the computing device over any appropriate network, including an intranet, the Internet, a cellular network, a local area network (LAN), a wide area network (WAN), a wireless data network or a similar network or combination of networks.

The client device 770 may include a display 785. The display 785 may comprise, for example, one or more devices such as cathode ray tubes (CRTs), liquid crystal display (LCD) screens, gas plasma based flat panel displays, LCD projectors, or other types of display devices, etc.

The client device 770 may be configured to execute various applications such as a browser 775, a respective page or content access application 780 for accessing video content or the like and/or other applications. The browser 775 may be executed in a client device 770, for example, to access and render content pages, such as web pages or other network content served up by the computing device 710 and/or other servers. The content access application 780 may be executed to obtain and render for display content features from the server or computing device, or other services and/or local storage media.

In some implementations, the content access application 780 may correspond to code that is executed in the browser 775 or plug-ins to the browser 775. In other implementations, the content access application 780 may correspond to a standalone application, such as a mobile application. The client device may be configured to execute applications beyond those mentioned above, such as, for example, mobile applications, email applications, instant message applications and/or other applications. Customers at client devices 770 may access content features through content display devices or through content access applications 780 executed in the client devices 770.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

It should be appreciated that although certain implementations disclosed herein are described in the context of computing instances or virtual machines, other types of computing configurations can be utilized with the concepts and technologies disclosed herein. For instance, the technologies disclosed herein can be utilized directly with physical hardware storage resources or virtual storage resources, hardware data communications (i.e., networking) resources, I/O hardware and with other types of computing resources.

Figure 8:
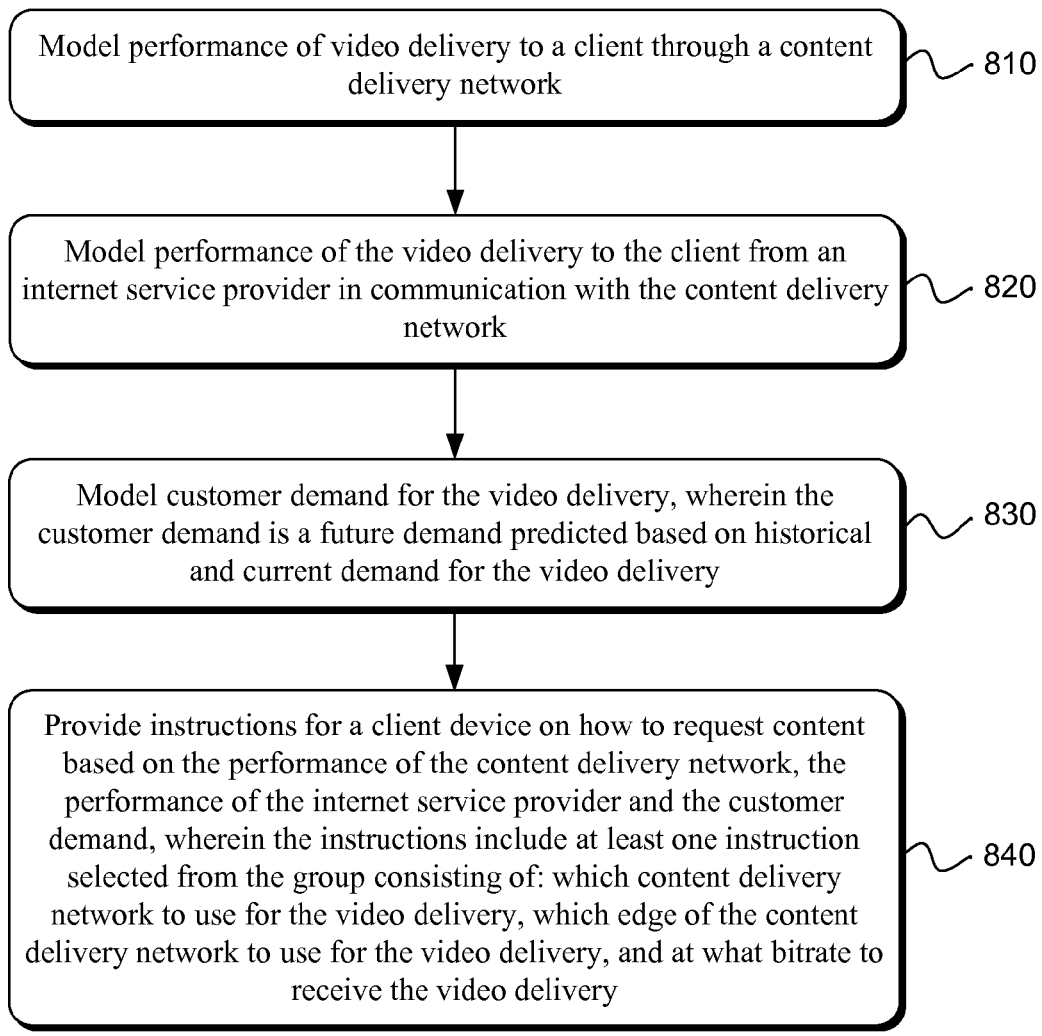
FIGS. 8-9 are flow diagrams for methods for content delivery in accordance with examples of the present technology.
Figure 9:
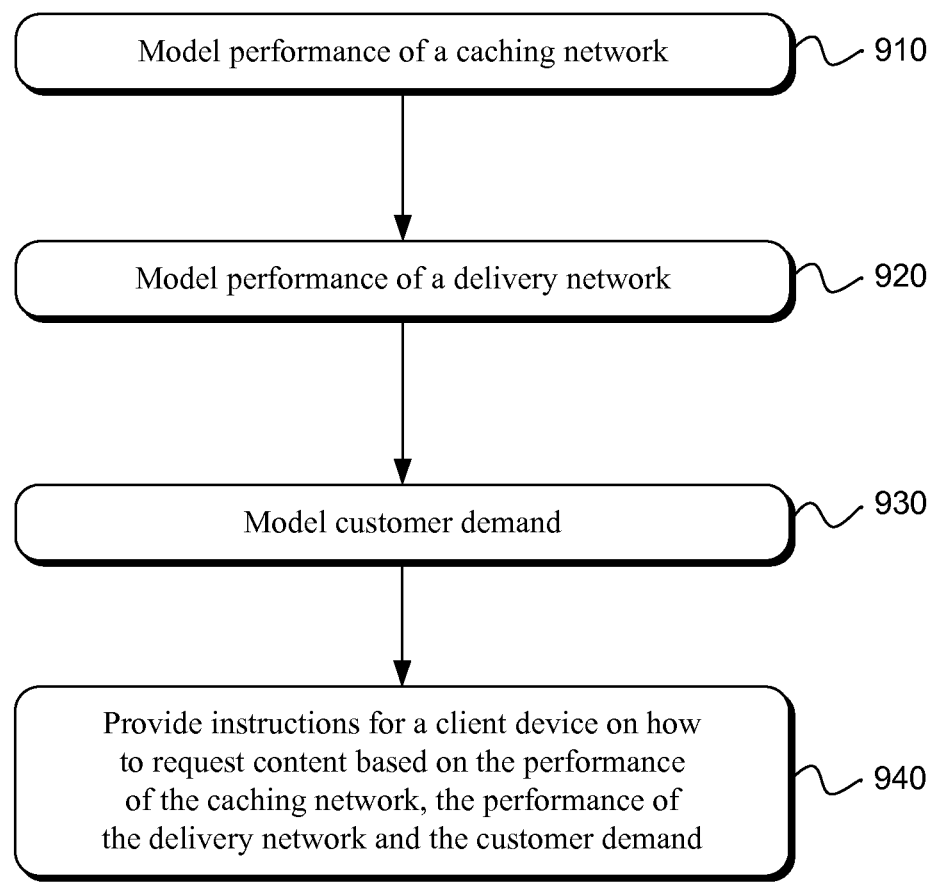

FIGS. 8-9 illustrate flow diagrams of methods according to the present technology. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Additional example details, operations, options, variations, etc. that may be part of the method have been described previously herein and/or are described in further detail below. Various systems, devices, components, modules and so forth for implementing the method may also be used, as described with respect to the various examples included in this disclosure.

Referring now to FIG. 8, a flow diagram of a method for content delivery is illustrated in accordance with an example of the present technology. The method may include being implemented on a computing device that is configured to facilitate organization of the streaming data. The computing device may include a processor, a memory in electronic communication with the processor, and instructions stored in the memory. The instructions may be executable by the processor to perform the method of FIG. 8.

The method may include generating, at 810, a content delivery model of performance of video delivery to a client through a content delivery network. An internet service provider model of performance of the video delivery to the client from an internet service provider in communication with the content delivery network may also be generated at 820. At 830, a customer demand model of customer demand for the video delivery may be generated. The customer demand may represent a future demand predicted based on historical and/or current demand for the video delivery. Instructions may be provided, at 840, for a client device on how to request content based on the performance of the content delivery network, the performance of the internet service provider and the customer demand. For example, the instructions may include at least one of: which content delivery network to use for the video delivery, which edge of the content delivery network to use for the video delivery, or at what bitrate to receive the video delivery.

In one example, output from the content delivery model, the internet service provider model and the customer demand model may be used as an input for each one of: the content delivery model, the internet service provider model and the customer demand model. Also, other models may be created to further improve heuristics for directing content delivery. For example, the method may include modeling customer satisfaction based on implicit or explicit feedback from the customer to use as an input for at least one of the content delivery model, the internet service provider model or the customer demand model. The customer satisfaction may relate to satisfaction with the content delivered and/or the delivery of the content. In some cases, customer satisfaction with content may be related to the performance of the content delivery, and a customer may be more satisfied with content when the content is well-delivered as opposed to poorly delivered. For example, a customer may grow bored with or disinterested in content if there is a small amount of buffering and delay in delivering the content, particularly if the pace or flow of the story or other presentation in the content is already somewhat slow or if the story is borderline uninteresting to the customer already.

The customer satisfaction model may have a customer experience score as an output. The score may be used to optimize content delivery for overall satisfaction relative to a video quality rating. Various scores from the different models may be tied together or correlated. For example, video quality, audio quality, network issues, etc. may have an input on the customer experience score. The customer satisfaction model may be used to identify what matters to customers in order to maximize overall customer satisfaction. Various inputs used in this or other models may be weighted such that some factors have a greater impact on projections and outputs than others.

Selection of CDN to use is one option for a client device to choose in improving content delivery. Another example may be a protocol over which the content is to be delivered. Other examples are the edges of CDNs from which to request the content, and so forth. Additional examples are described elsewhere in this document.

Content consumption patterns of customers may be relatively consistent. CDN partners may work with any number of content or service providers. For example, if the present technology is used for a first service provider and a surge in traffic from a competing provider is anticipated that will reduce quality of customers of the first service provider, the first service provider may move these to a different CDN partner in advance of the surge. Decisions may be made in terms of specific locations that may be impacted or rules governing how conservative to be in affecting client use of available bandwidth. Having a better overview of the system, the present technology may, for example, instruct client devices to not attempt to switch to another CDN or make other modifications in content delivery requests if other potential links are congested. Decisions may be time dependent and dependent on the state of different components of the network at any given time.

The method may include real-time sampling of multiple CDNs. For example, the method may include sampling from CDN A and CDN B and selecting the CDN that provides the fastest video delivery. CDN A and CDN B may be resampled again to select the CDN that provides the fastest delivery. Resampling may be performed at predefined periodic intervals. In one implementation, the method may include constant measuring throughput of two parallel connections or two endpoints per CDN. Changes may be made based on performance to affect or modify the pattern for which packets are delivered from the CDNs, which CDN is a dominant provider of the content, and so forth.

In some cases, clients may be behind an ISP cache. These clients may be instructed to use or request content that has been previously cached for a different customer of the content delivery service. Historical records may provide useful input for informing decisions. For example, on every Tuesday for a particular period of time, a link in Los Angeles may have been congested, so a decision may be made to not use that link in Los Angeles on Tuesdays. Much of human behavior may be predictable given a particular time period or schedule.

Some additional inputs to the models may include how many simultaneous streams there are globally, per CDN; which titles are most popular; upcoming availability of titles which are not currently available but which are expected to have an anticipated popularity; time related inputs, such as whether the time is a weekday or weekend, what time of day it is, what day of the week, or day of the year it is; and so forth.

Each model can be evolved independently using observational data from real life. The models may be used to project into the future. Inputs from each of the models may depend on the outputs from the other models. The method may project what will happen to the network in the next minute, what will happen to popularity, what will happen to the network, etc., and then use these projections as inputs to the other models. The larger the amount of time in advance the method attempts to predict, the more error may be likely encountered. Thus, smaller, iterative projections may be preferable for better performance.

Referring now to FIG. 9, a flow diagram of a method for content delivery is illustrated in accordance with an example of the present technology. The method may include generating a content delivery model at 910 modeling performance of a caching network, such as content delivery network, by way of example. The method may also include generating a delivery network model at 920 modeling performance of a delivery network, such as an internet service provider for example. The method may still further include generating a customer demand model at 930 modeling customer demand. Based on the modeled performance of the caching network, the modeled performance of the delivery network and the modeled customer demand, instructions may be provided at 940 for a client device on how to request content to improve content delivery to the client device.

Example delivery inputs for the content delivery model may include one or more selected from the group consisting of: stream count, delivered bitrate, bitrate distribution, caching network capacity and events. Example inputs for the internet service provider model may include one or more selected from the group consisting of: the performance of the caching network, client latency, caching network latency, internet service provider throughput, delivered bitrate and customer demand. Example inputs for the customer demand model may include one or more selected from the group consisting of: recent demand, comparative demand, past demand trends, the performance of the caching network, the performance of the delivery network and events. Feedback may be received from the client device regarding at least one of client performance, delivery network performance or caching network performance to use as input for modeling the performance of the caching network, modeling the performance of the delivery network or modeling the customer demand. Such feedback may be used directly or indirectly as inputs to the different models.

The models may be used to predict or model performance, demand, etc. at predetermined time intervals, at times determined based on historical trends, or in response to events. Based on the predictions, various instructions may be given to the client device such as whether to select a different caching network or to a different edge of a same caching network, whether to select a different content delivery bitrate when content delivery is expected to improve, and so forth.

Similarly as mentioned in the description of the method illustrated in FIG. 8, additional example details, operations, options, variations, etc. that may be part of the method illustrated in FIG. 9 have been described previously herein and/or are described in further detail below. Various systems, devices, components, modules and so forth for implementing the method may also be used, as described with respect to the various examples included in this disclosure.

Figure 10:
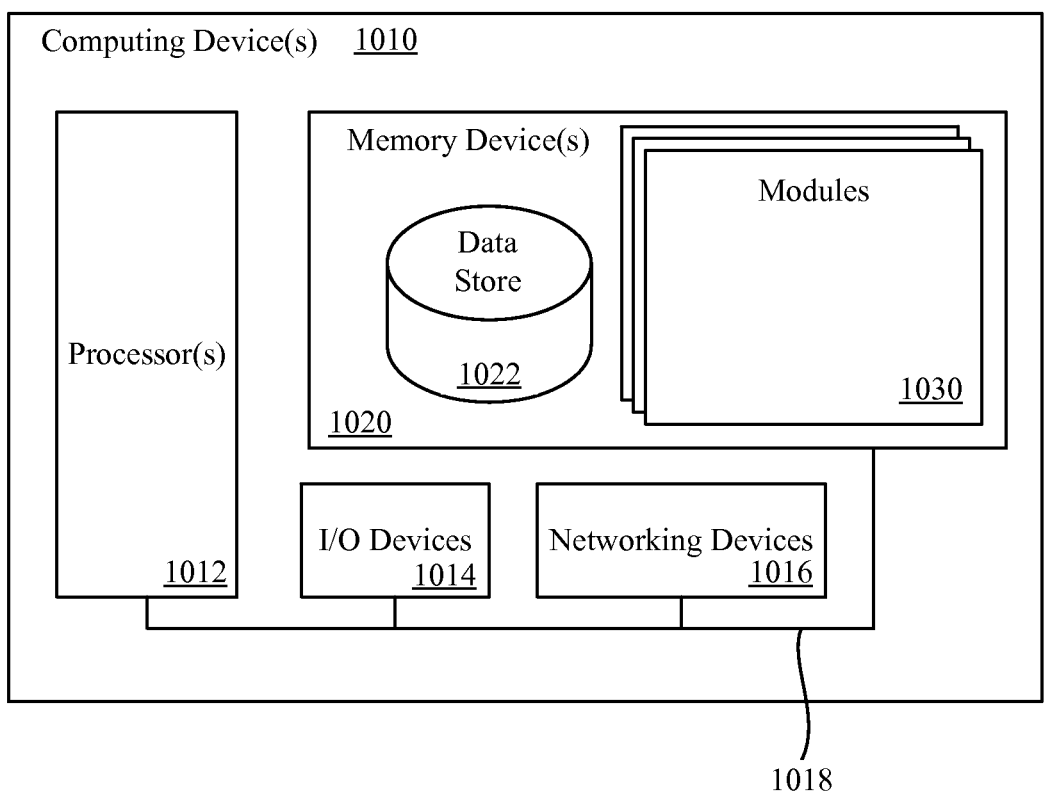
FIG. 10 is a block diagram of a computing system for content delivery in accordance with an example of the present technology.

FIG. 10 illustrates a computing device 1010 on which services or modules of this technology may execute. A computing device 1010 is illustrated on which a high level example of the technology may be executed. The computing device 1010 may include one or more processors 1012 that are in communication with memory devices 1020. The computing device 1010 may include a local communication interface 1018 for the components in the computing device. For example, the local communication interface 1018 may be a local data bus and/or any related address or control busses as may be desired.

The memory device 1020 may contain modules 1030 that are executable by the processor(s) and data for the modules. A data store 1022 may also be located in the memory device 1020 for storing data related to the modules and other applications along with an operating system that is executable by the processor(s) 1012.

The computing device 1010 may further include or be in communication with a client device, which may include a display device. The client device may be available for an administrator to use in interfacing with the computing device 1010, such as to review operation of the video processing, to make improvements to machine learning face detection models and so forth.

Various applications may be stored in the memory device 1020 and may be executable by the processor(s) 1012. Components or modules discussed in this description that may be implemented in the form of software using high programming level languages that are compiled, interpreted or executed using a hybrid of the methods.

The computing device 1010 may also have access to I/O (input/output) devices 1014 that are usable by the computing devices. An example of an I/O device 1014 is a display screen that is available to display output from the computing devices. Other known I/O device may be used with the computing device as desired. Networking devices 1016 and similar communication devices may be included in the computing device 1010. The networking devices 1016 may be wired or wireless networking devices 1016 that connect to the internet, a LAN, WAN, or other computing network.

The components or modules that are shown as being stored in the memory device 1020 may be executed by the processor 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor 1012. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory 1020 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is noted that any of the distributed system implementations described above, or any of their components, may be implemented as one or more web services. In some implementations, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various implementations, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some implementations, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The invention claimed is:

1. A non-transitory computer-readable medium comprising computer-executable instructions which, when executed by a processor, implement a video delivery method, comprising:
   generating a content delivery model of performance of video delivery to a client through a content delivery network;
   generating an internet service provider model of performance of the video delivery to the client from an internet service provider in communication with the content delivery network;
   generating a customer demand model of customer demand for the video delivery, wherein the customer demand is a future demand predicted based on historical and current demand for the video delivery; and
   providing instructions for a client device on how to request content based in part on the performance of the content delivery network, the performance of the internet service provider and the customer demand, wherein the instructions include at least one of: which content delivery network to use for the video delivery, which edge of the content delivery network to use for the video delivery, or at what bitrate to receive the video delivery.

2. The computer-readable medium of claim 1, wherein output from each of the content delivery model, the internet service provider model and the customer demand model is used as an input for each other of the content delivery model, the internet service provider model and the customer demand model.

3. The computer-readable medium of claim 1, wherein the method further comprises modeling customer satisfaction based on implicit or explicit feedback from the customer to use as an input for at least one of the content delivery model, the internet service provider model or the customer demand model.

4. The computer-readable medium of claim 1, wherein at least one of: modeling the performance of the content delivery network, modeling the performance of the internet service provider or modeling the customer demand comprises modeling using a multilayer neural network or regression machine learning method.

5. A computer-implemented content delivery method, comprising:
   generating a content delivery model modeling performance of a caching network using a processor;
   generating a delivery network model modeling performance of a delivery network using the processor;
   generating a customer demand model modeling customer demand using the processor; and
   providing instructions for a client device to request content to improve content delivery based in part on the modeled performance of the caching network, the modeled performance of the delivery network and the modeled customer demand.

6. The method of claim 5, further comprising instructing the client device to select a different caching network or to a different edge of a same caching network, or instructing client to select a different content delivery bitrate when content delivery is expected to improve based on the modeling of at least one of the performance of the caching network, the performance of the delivery network or the customer demand.

7. The method of claim 5, further comprising creating projections of future performance and generating the instructions based on improved customer experience for customers.

8. The method of claim 5, wherein the content delivery model includes one or more delivery inputs selected from the group consisting of: stream count, delivered bitrate, bitrate distribution, caching network capacity and events.

9. The method of claim 5, wherein the delivery network model includes one or more inputs selected from the group consisting of: the performance of the caching network, client latency, caching network latency, delivery network throughput, delivered bitrate and customer demand.

10. The method of claim 5, wherein the customer demand model includes one or more inputs selected from the group consisting of: recent demand, comparative demand, past demand trends, the performance of the caching network, the performance of the delivery network and events.

11. The method of claim 5, further comprising receiving feedback from the client device regarding at least one of client performance, delivery network performance or caching network performance to use as input for modeling the performance of the caching network, modeling the performance of the delivery network or modeling the customer demand.

12. The method of claim 5, further comprising modeling customer satisfaction based on customer scoring of delivery of the content and using the modeled customer satisfaction as an input for modeling the performance of the caching network, modeling the performance of the delivery network or modeling the customer demand.

13. The method of claim 5, further comprising modeling customer satisfaction based on customer scoring of the content delivered.

14. The method of claim 5, further comprising performing the modeling of the performance of the caching network, the performance of the delivery network or the customer demand for at least one of: predetermined time intervals, at times determined based on historical trends, or in response to events.

15. A non-transitory computer-readable medium comprising computer-executable instructions which, when executed by a processor, implement a content delivery system, comprising:

a content module configured to deliver content in response to a request for the content;

a performance module configured to monitor performance of delivery of the content;

a learning module configured to model a caching network, an delivery network, and customer demand for a future time based on current and historical data;

a delivery module configured to make a determination of how to deliver the content to a client device using the models from the learning module; and a communication module to communicate the determination to a client.

16. The computer-readable medium of claim 15, further configured to implement a system comprising a reports data store to store performance of delivery of the content received from the client.

17. The computer-readable medium of claim 15, wherein the communication module is configured to receive communications from the client regarding the performance of the delivery of the content.

18. The computer-readable medium of claim 15, wherein the learning module is a machine learning module using a multilayer neural network or regression.

19. The computer-readable medium of claim 15, wherein output from each model is used as an input for each other model.

20. The computer-readable medium of claim 15, wherein the learning module is further configured to model customer satisfaction.

* * * * *